United States Patent [19]
Yoo

[11] Patent Number: 5,627,864
[45] Date of Patent: May 6, 1997

[54] PHASE SHIFT CORRECTING APPARATUS OF A SYNC DETECTOR IN A SATELLITE BROADCASTING RECEPTION SYSTEM

[75] Inventor: Yong T. Yoo, Seoul, Rep. of Korea

[73] Assignee: LG Electronics Inc., Seoul, Rep. of Korea

[21] Appl. No.: 563,949

[22] Filed: Nov. 29, 1995

[30] Foreign Application Priority Data

Nov. 30, 1994 [KR] Rep. of Korea .................. 31926/1994

[51] Int. Cl.⁶ .................................................. H04L 7/04
[52] U.S. Cl. ........................ 375/362; 370/516; 375/365
[58] Field of Search ............................ 370/106, 105.5; 375/365, 366, 362

[56] References Cited

U.S. PATENT DOCUMENTS

| | | | |
|---|---|---|---|
| 4,376,306 | 3/1983 | Giusto | 370/105.5 |
| 4,414,677 | 11/1983 | Ive et al. | 375/366 |
| 4,763,339 | 8/1988 | Sutphin et al. | 370/106 |
| 4,965,814 | 10/1990 | Yoshida et al. | 375/362 |
| 5,016,206 | 5/1991 | Shinonaga | 375/366 |
| 5,101,401 | 3/1992 | Suzuki et al. | 370/106 |
| 5,363,417 | 11/1994 | Sempe | 375/365 |
| 5,519,444 | 5/1996 | Ko et al. | 375/362 |

*Primary Examiner*—Stephen Chin
*Assistant Examiner*—Joseph Roundtree
*Attorney, Agent, or Firm*—John P. White

[57] ABSTRACT

A phase shift correcting apparatus of a sync detector in a satellite broadcasting reception system corrects a phase shift of 180° which makes output data after demodulation be absolutely different from an original data such that 47 sync is phase-shifted by 180° to be detected as B8 sync data. For this, the number of B8 data and 47 data of input data is counted in a comparator and a counter to determine whether the phase shift of 180° occurs or not, and data involving the phase shift is converted to have a normal data value when it is determined that the phase shift occurs, thereby improving reliability of a satellite broadcasting receiver and solving the problem of the different data output.

2 Claims, 3 Drawing Sheets

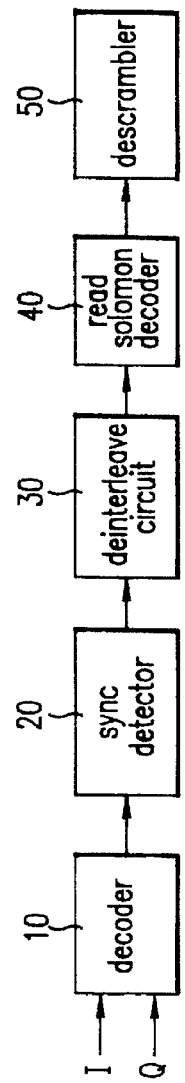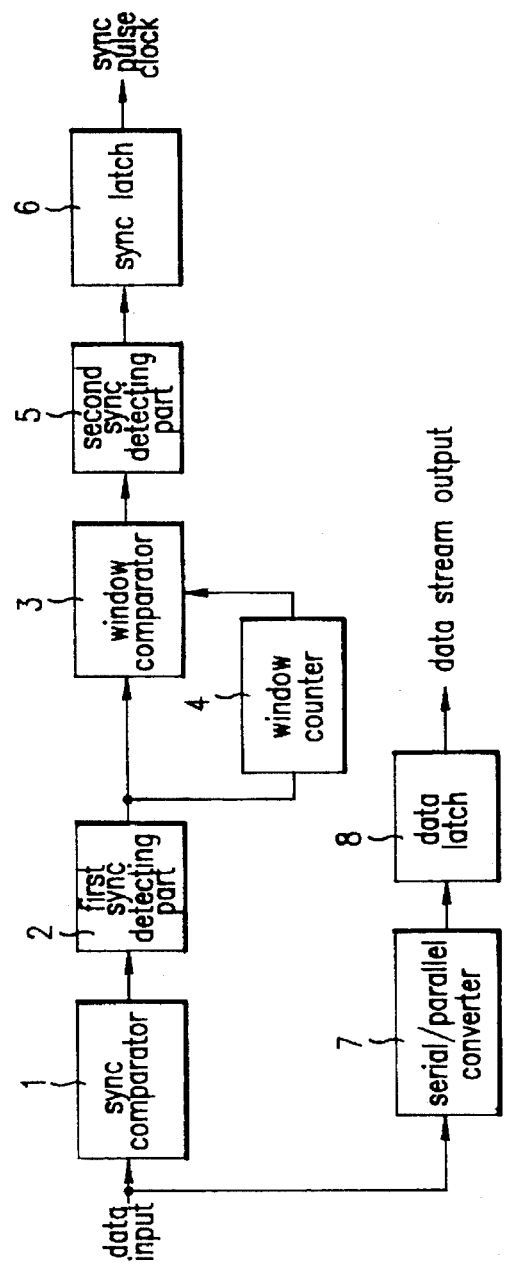

sync data

F I G.4
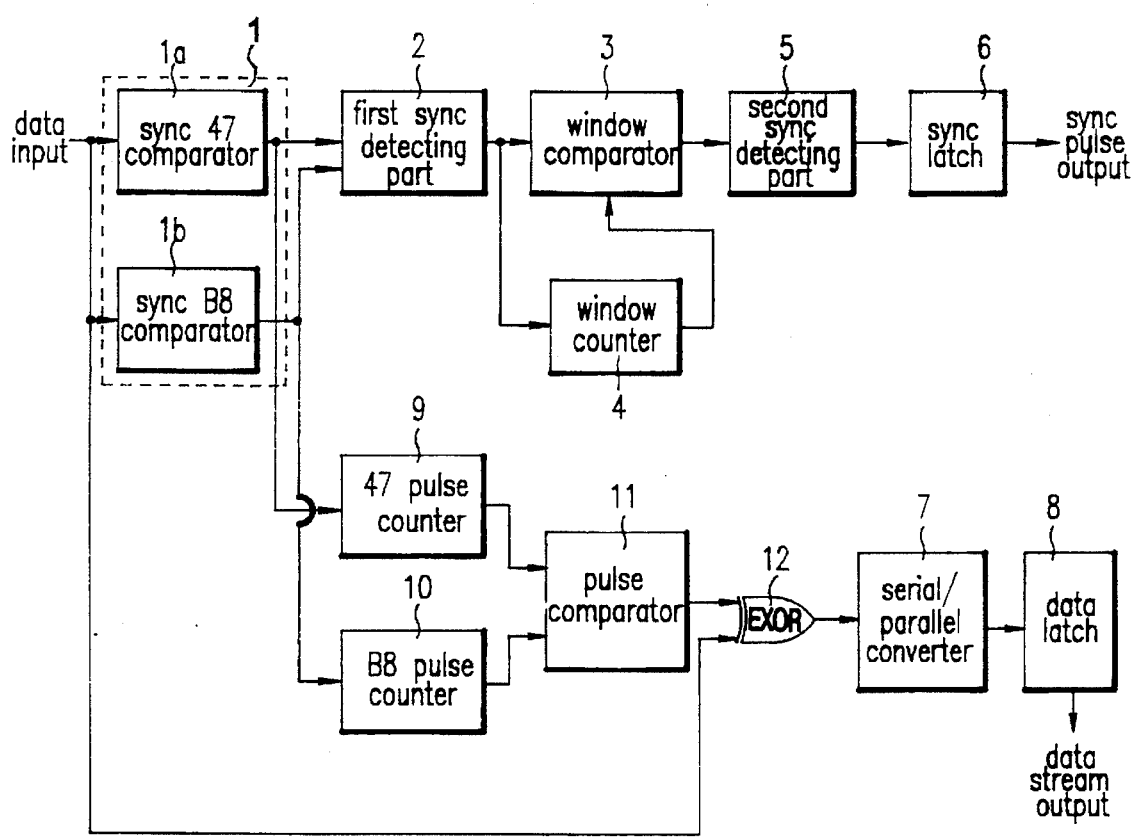
F I G.5A
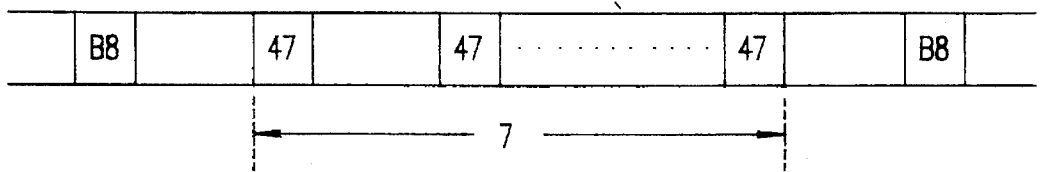
F I G.5B
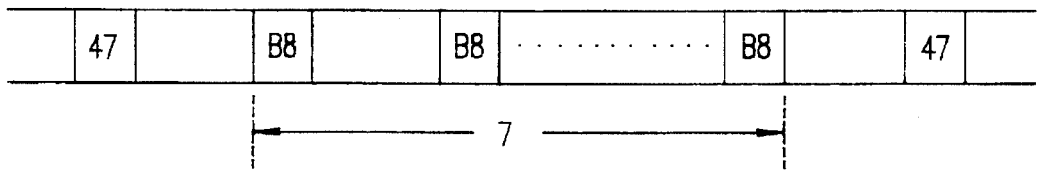

PHASE SHIFT CORRECTING APPARATUS OF A SYNC DETECTOR IN A SATELLITE BROADCASTING RECEPTION SYSTEM

BACKGROUND OF THE INVENTION

The present invention relates to a correcting apparatus in a sync signal detector suitable for a satellite broadcasting transmission/reception system format of Korean and European districts for correcting to output original data when 47 sync is phase-shifted by 180° to be provided as B8 sync, and more particularly to a phase shift correcting apparatus of a sync detector in a satellite broadcasting reception system for detecting and correcting a phase shift of 180° during a sync detection of a QPSK (Quadrature Phase Shift Key) signal.

In order to demodulate a QPSK signal in a satellite broadcasting reception system, as shown in FIG. 1, I and Q signals are decoded in a decoder 10, and a sync signal is detected from a sync detector 20. Thus, an error of the I and Q signals being synchronized via a deinterleave circuit 30 with respect to a transport packet is checked. Then, the I and Q signals completely subjected to the error checking are decoded in a Read-Solomon decoder 40 to be restored via a descrambler 50.

Here, conventional sync detector 20 utilized for demodulating the QPSK signal is provided to demodulate the QPSK signal using a unique sync word, of which circuit construction is illustrated in FIG. 2.

As shown in FIG. 2, sync detector 20 according to the conventional technique includes a sync comparator 1 for comparing input data and the sync, and a first sync detecting part 2 for separating to detect sync data from the output data of sync comparator 1. A window comparator 3 compares the sync data in a sync data section from first sync detecting part 2, and a window counter 4 provides a window pulse of the sync section to window comparator 3. A second sync detecting part 5 detects a sync signal from the output signal of window comparator 3, and a sync latch 6 latches the output of second sync detecting part 5 to supply a sync pulse. A serial/parallel converter 7 converts the input data into parallel data, and a data latch 8 latches the data from serial/parallel converter 7 for supplying data stream.

The sync detector constructed as above according to the conventional technique compares the data received in a format as shown in FIG. 3A in sync comparator 1 to separate the sync data as shown in FIG. 3B in first sync detector 2.

The sync data is compared with the pulse as shown in FIG. 3C supplied from window counter 4 in window comparator 3 to be provided to second sync detecting part 5. By doing so, second sync detecting part 5 detects the sync signal as shown in FIG. 3D, thereby producing a sync pulse clock via sync latch 6.

Meantime, the input data is converted to the parallel data in serial/parallel converter 7 to be supplied as the data stream via data latch 8.

However, in the sync detector according to the conventional technique constructed as above is utilized only when demodulating the unique sync word bitstream for preventing the phase shift of 90°, 180° and 270° during the reception of the QPSK signal, i.e., the QPSK signal using the transport packet. Consequently, it is not suitable for the satellite broadcasting system of the Korea and European district having different signal (transmitting) format due to the distinction of the areas.

Furthermore, since the descrambler is constructed to be reset when the sync value is B8, the occurrence of the phase shift of 180° in the sync signal serves as a reset of the descrambler whenever the 47 sync data is phase-shifted by 180° to be supplied as B8 sync data. Therefore, the data demodulated to be output is changed as the data which is absolutely different from the original data.

SUMMARY OF THE INVENTION

The present invention is devised to solve the above-described problems. Accordingly, it is an object of the present invention to provide a phase shift correcting apparatus of a sync detector in a satellite broadcasting reception system, in which the number of B8 data and 47 data of the input data is counted to determine whether the phase shift of 180° occurs or not, and a produced phase shift resulting from the determination is corrected, thereby solving the foregoing problems while securing reliability of a satellite broadcasting receiver.

To achieve the above object of the present invention, there is provided a sync detector including a sync comparator for comparing input data and a sync, a first sync detecting part for separating to detect sync data from output data of the sync comparator, a window comparator for comparing the sync data in a sync data section from the first sync detecting part, a window counter for providing a window pulse of the sync section to the window comparator, a second sync detecting part for detecting a sync signal from an output signal of the window comparator, a sync latch for latching an output of the second sync detecting part to provide a sync pulse, a serial/parallel converter for converting the input data to parallel data, and a data latch for latching data from the serial/parallel converter to supply data stream, wherein a phase shift correcting apparatus of the sync detector in a satellite broadcasting reception system includes a sync 47 comparator and a sync B8 comparator for comparing the input data with sync 47 data and sync B8 data, respectively, and a 47 pulse counter for counting a sync 47 pulse from the sync 47 comparator. Additionally, a B8 counter counts a sync B8 pulse from the sync B8 comparator, a pulse comparator compares values counted in the counters, and a data converter allows for passing the input data therethrough or corrects the input data into normal data in accordance with the result of the comparison from the pulse comparator prior to supplying the data.

BRIEF DESCRIPTION OF THE DRAWINGS

The above objects and other advantages of the present invention will become more apparent by describing in detail preferred embodiments thereof with reference to the attached drawings in which:

FIG. 1 is a block diagram showing a construction of a decoder part in a general satellite broadcasting reception system;

FIG. 2 is a block diagram showing a construction of a sync signal detector in the satellite broadcasting system according to a conventional technique;

FIG. 4 is a block diagram showing a construction of a phase shift correcting apparatus of a sync detector according to the present invention; and FIGS. 5A and 5B are timing charts showing a correcting operation by the phase shift correcting apparatus according to the present invention.

DETAILED DESCRIPTION OF THE PREFERRED EMBODIMENT

Figure 3A:
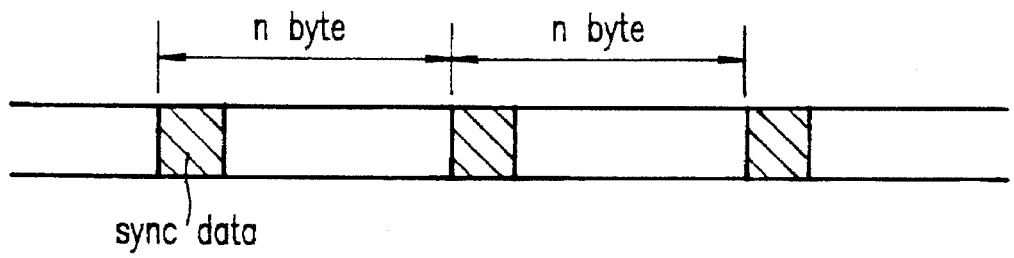
FIGS. 3A to 3D are signal timing charts of the sync signal detector according to the conventional technique.

Hereinbelow, a preferred embodiment of a phase shift correcting apparatus of a sync detector in a satellite broadcasting reception system according to the present invention will be described in detail with reference to accompanying.

Referring to FIG. 4, the phase shift correcting apparatus of the sync detector in the satellite broadcasting reception system according to the present invention includes a sync 47 comparator 1a for comparing sync 47 data of input data, and a sync B8 comparator 1b for comparing sync B8 data of the input data. Also, a sync comparator 1 compares the sync of the input data by receiving the data from comparators 1a and 1b. A first sync detecting part 2 separates the sync data from the data supplied from comparators 1a and 1b. A window comparator 3 compares the sync data in a sync data section from first sync detecting part 2. A window counter 4 supplies a window pulse of the sync section to window comparator 3, and a second sync detecting part 5 detects a sync signal from the output signal of window comparator 3. A sync latch 6 latches the output of second sync detecting part 5 to provide a sync pulse. A 47 pulse counter 9 counts the sync 47 pulse from sync 47 comparator 1a. A B8 counter 10 counts the sync B8 pulse from sync B8 comparator 1b. A pulse comparator 11 compares values counted in counters 9 and 10. A data converter 12 allows the input data to pass therethrough intact or corrects it into supply normal data in accordance with the result of comparison from pulse comparator 11, a serial/parallel converter 7 converts the data from data converter 12 to parallel data, and a data latch 8 latches the parallel data from serial/parallel converter 7 to supply data stream.

An operation of the phase shift correcting apparatus of the sync detector in the satellite broadcasting reception system according to the present invention constructed as above will be described below.

First, sync 47 comparator 1a compares the sync 47 data in the input data stream to supply a corresponding sync pulse, and sync B8 comparator 1b compares the sync B8 data in the input data stream to supply a corresponding sync pulse.

In FIG. 5, label 47 and label B8 both designate a hexa code.

The sync pulse output is supplied to first sync detecting part 2, 47 sync pulse is to 47 pulse counter 9 and B8 sync pulse is to B8 pulse counter 10.

Figure 3B:
Figure 3C:
Figure 3D:

First sync detecting part 2 separates the sync data as shown in FIG. 3B. This sync data is compared with the pulse as shown in FIG. 3C from window counter 4 in window comparator 3 to be provided to second sync detecting part 5. Thus, second sync detecting part 5 detects the sync signal as shown in FIG. 3D to supply the sync pulse via sync latch 6.

On the other hand, 47 pulse counter 9 counts the number of the 47 sync pulse from 47 comparator 1a, and B8 pulse counter 10 counts the number of the B8 sync pulse from sync B8 comparator 1b. Here, in case of the normal data, as shown in FIG. 5A, the counting number of 47 pulse counter 9 is seven, and that of B8 pulse counter 10 is one.

In this case, pulse comparator 11 produces a low signal as the result of comparing the two counter values, and data converter 12 allows the input data to pass through unchanged when the low signal and data input signal combined in pulse comparator 11 are received, thereby supplying it to serial/parallel converter 7 at the succeeding stage.

However, when the phase shift of 180° occurs, the counter value of B8 pulse counter 10 becomes greater than that of 47 pulse counter 9 as shown in FIG. 5B. In this instance, pulse comparator 11 supplies a high signal as the result of comparing the two counter values.

Data converter 12 converts the input data when the high signal is received from pulse comparator 11 to correct it as the normal data shifted by 180°, and outputs the corrected data.

The logic of data converter 12 is embodied by constituting data converter 12 with an exclusive OR gate.

When the normal data or corrected normal data is received into serial/parallel converter 7, the input data is converted into the parallel data in serial/parallel converter 7 to be supplied via data latch 8.

As described above, the phase shift of 180° of the sync data is corrected to be supplied to the descrambler at the succeeding stage, so that the normal data is continuously provided. Therefore, in the satellite broadcasting reception system of Korea and European district, an operational error can be prevented which in turn improves reliability of the apparatus.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. In a sync detector including a sync comparator for comparing input data and a sync, a first sync detecting part for separating to detect sync data from output data of said sync comparator, a window comparator for comparing said sync data in a sync data section from said first sync detecting part, a window counter for providing a window pulse of the sync section to said window comparator, a second sync detecting part for detecting a sync signal from an output signal of said window comparator, a sync latch for latching an output of said second sync detecting part to provide a sync pulse, a serial/parallel converter for converting said input data to parallel data, and a data latch for latching data from said serial/parallel converter to supply data stream, a phase shift correcting apparatus of said sync detector in a satellite broadcasting reception system comprising:

a sync 47 comparator and a sync B8 comparator for comparing said input data with sync 47 data and sync B8 data, respectively;

a 47 pulse counter for counting a sync 47 pulse from said sync 47 comparator;

a B8 counter for counting a sync B8 pulse from said sync B8 comparator;

a pulse comparator for comparing values counted in said counters; and a data converter for passing said input data or correcting said input data into normal data in accordance with the result of the comparison from said pulse comparator prior to supplying said data.

2. A phase shift correcting apparatus of a sync detector in a satellite broadcasting reception system as claimed in claim 1, wherein said data converter is comprised of an exclusive OR gate for inverting to provide said input data in accordance with an output value of said pulse comparator.

* * * * *